United States Patent
Pritchard

[15] 3,674,915
[45] July 4, 1972

[54] ELECTRICAL CABLE HAVING AN ETHYLENE-1-OLEFIN COPOLYMER AS THE DIELECTRIC MATERIAL

[72] Inventor: James E. Pritchard, Bartlesville, Okla.
[73] Assignee: Phillips Petroleum Company
[22] Filed: June 1, 1971
[21] Appl. No.: 148,392

[52] U.S. Cl. ............................ 174/102 R, 174/28, 174/107
[51] Int. Cl. ........................................................ H01b 9/04
[58] Field of Search ............... 174/102 R, 107, 28, 110 PM; 260/88.2

[56] References Cited

UNITED STATES PATENTS

| | | | |
|---|---|---|---|
| 2,825,721 | 3/1958 | Hogan | 260/88.2 |
| 3,095,643 | 7/1963 | Cooke | 174/107 X |

Primary Examiner—E. A. Goldberg
Attorney—Young and Quigg

[57] ABSTRACT

An electrical cable having at least two spaced apart electrical conductors separated by a dielectric material comprising a copolymer of ethylene and a 1-olefin having at least three carbon atoms per molecule, the copolymer having a density in the range of about 0.928 to about 0.945 and the dielectric material having a dielectric constant of less than about 2.325, a dielectric dissipation factor of less than about 55 microradians at 30 megahertz, and an environmental stress cracking resistance of at least 800 hours.

12 Claims, 1 Drawing Figure

PATENTED JUL 4 1972
3,674,915
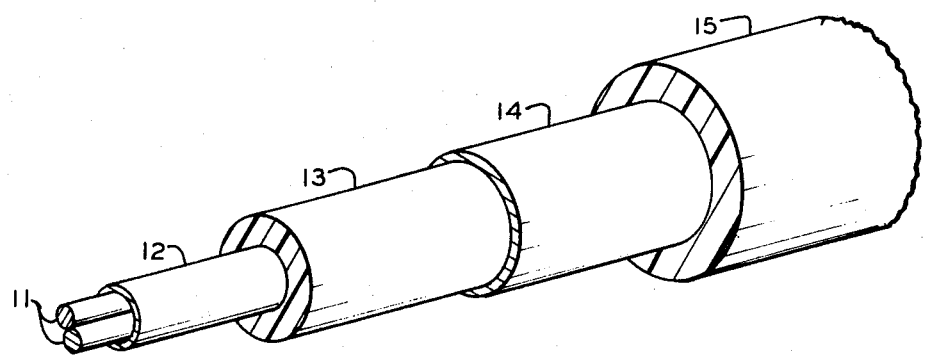
INVENTOR.
J.E. PRITCHARD
BY *Young & Quigg*
ATTORNEYS

ELECTRICAL CABLE HAVING AN ETHYLENE-1-OLEFIN COPOLYMER AS THE DIELECTRIC MATERIAL

One of the objectives in the design of a suboceanic electrical transmission cable is to increase the number of communication channels which the cable can carry. One technique for achieving this objective has been to increase the frequency bandwidth of the cable. However, in coaxial cables, as in many other electrical applications, the attenuation increases as the frequency of the transmitted signal increases, so that signal losses are significantly greater at higher frequencies. These losses become prohibitively high for commercial long distance transmissions for most dielectric materials for signals exceeding 10 megahertz. Thus, the search for a dielectric material having sufficiently low attenuation at frequencies above 10 megahertz has been pursued unendingly. However, some of the other requirements for a cable dielectric material, such as a low dielectric constant, low density, high environmental stress cracking resistance, and the like, have eliminated from consideration many of the dielectric materials which have low dielectric dissipation factors at high frequencies. Thus, the favorable mechanical properties of low density homopolymers of ethylene have led to the employment of these polymers as the dielectric material in recent commercial suboceanic coaxial cables despite the relatively higher dielectric dissipation factors thereof in comparison to high density homopolymers of ethylene. The dielectric dissipation factor for the solid low density, high molecular weight homopolymer of ethylene utilized as the dielectric material in the SF cable system (described in Bell Systems Technical Journal 49, pages 699–719, May–June, 1970) is specified as 79±5 microradians at 6 megahertz, which is 4 times greater than that of some of the commercially available high density homopolymers of ethylene at the same frequency. The SF cable is capable of transmitting over 800 two-way telephone conversations simultaneously, employing a signal frequency band from about 400 kilohertz to about 6 megahertz. However, this low density homopolymer is not commercially feasible for use in projected cables having an upper frequency limit of about 30 megahertz.

Accordingly, it is an object of the present invention to provide a new and improved dielectric material for electrical cables. It is an object of the invention to provide a coaxial cable which can effectively transmit signals having frequencies up to 30 megahertz and higher. Another object of the invention is to reduce the dielectric loss in a coaxial cable at high frequencies. Other objects, aspects and advantages of the invention will be apparent from a study of the specification, the drawing and the appended claims to the invention.

In the drawing the single FIGURE is a perspective view in cross section of an armorless coaxial cable similar in construction to the SF cable except for the different dielectric material. A plurality of steel strands 11 are surrounded by the inner electrical conductor 12, which is substantially annular in form. The dielectric material 13 occupies substantially all, and preferably all, of the annular space between inner conductor 12 and the outer electrical conductor 14. Conductor 14 is also annular in form and is coaxial with conduit 12. A cable coating or protective sheathing 15 surrounds conductor 14. Each of conductors 12 and 14 can be in the form of extruded seamless tubing, tubing fabricated from sheeting, braid, spirally wound tape, an annular layer electroplated on a substrate, or any other form known in the art. If desired, a lubricant or slip agent can be provided between conductor 12 and the steel strands, between conductor 12 and the dielectric material 13, between dielectric material 13 and outer conductor 14, and/or between conductor 14 and the protective sheathing 15. The cable coating 15 can be any suitable material, for example a high density homopolymer of ethylene, or copolymer of ethylene and at least one other 1-olefin. The cable coating 15 usually will contain a material such as carbon black to minimize degradation of the polymer during exposure to sunlight.

In accordance with the present invention, the dielectric material 13 comprises a copolymer of ethylene and at least one 1-olefin having at least three carbon atoms per molecule, the copolymer having a density (ASTM-D 1505–68 on samples molded by D-1928, Condition C, and cooling the press at 15° C./minute) in the range of about 0.928 to about 0.945 gram/cc, preferably in the range of about 0.930 to about 0.937 gram/cc. While 1-olefins having from three to 12 and higher carbon atoms per molecule can be employed as the comonomer, linear 1-olefins having from four to 10 carbon atoms are presently preferred. Suitable comonomers include propylene, n-1-butene, n-1-pentene, n-1-hexene, n-1-heptene, n-1-octene, n-1-nonene, n-1-decene, n-1-dodecene, n-1-tetradecene, and the like, and combinations thereof. The copolymerization is preferably conducted in the presence of a catalyst comprising chromium oxide associated with at least one oxide from the group consisting of silica, alumina, zirconia, and thoria. At least a portion of the chromium is hexavalent. The total chromium content of the catalyst is preferably between 0.1 and 10 weight per cent. The catalyst can be activated by heating in an oxygen containing gas, for example, air, for a period ranging, for example, from about 30 minutes up to 50 hours or more. The activation seldom exceeds 30 hours and more frequently is in the range of about 1 to 10 hours. Activation temperatures range from about 450° F. to 1,600° F. and preferably in the range of about 1,200° to 1,600° F. The activating gas should be substantially water-free. Preferably the dew point of the gas is below 75° F. and more preferably below 0° F.

The copolymerization can ordinarily be carried out at a pressure ranging from atmospheric to 1,000 pounds per square inch absolute or higher; however, generally this reaction is known as low pressure polymerization. The temperature for the polymerization reaction is usually in the range of about 100° to about 500° F. A more detailed disclosure of a polymerization process which produces solid polymer is found in Hogan and Banks, U. S. Pat. No. 2,825,721. When operating in the temperature range of about 150° to 225° F. with a liquid hydrocarbon diluent which is inert in the polymerization reaction, it is possible to produce high molecular weight copolymers of ethylene with other 1-olefins which are insoluble in the hydrocarbon diluent under reactor conditions. This copolymer is formed in association with the polymerization catalyst and is suspended in the liquid diluent in solid particle form. Suitable diluents include paraffins and cycloparaffins having from three to 12 and preferably three to eight carbon atoms per molecule, for example, n-butane, isobutane, n-hexane, isopentane, the dodecanes, cyclopentane, methylcyclohexane and the like. Aromatic hydrocarbons having from six to 12 carbon atoms per molecule can be used but frequently are not preferred since these hydrocarbons, or impurities which normally accompany them, appear to deactivate the catalyst somewhat. The olefin reactants are contacted in the polymerization zone with a suspension of chromium oxide catalyst in the liquid hydrocarbon diluent at the aforementioned temperature and under pressure suitable to maintain the diluent in the liquid phase. Concentration of the catalyst in the reaction zone can vary widely; however, generally it will be in the range of 0.001 to 5 percent by weight based on the liquid hydrocarbon diluent. The effluent withdrawn from the reactor can be treated to separate the polymer from the diluent by decantation, filtration and/or vaporization. It is not necessary to treat the polymers to remove the catalyst. However, where desired, the polymer can be treated so as to separate catalyst from the polymer. Other methods of copolymerization which yield these copolymers having the desired properties can be employed. For example, another catalyst system which can be employed comprises chromium oxide and titanium oxide supported on silica, alumina or silica-alumina.

The dielectric material can consist solely of the copolymer where it is possible to fabricate the cable under essentially non-oxidizing conditions. However, oxidative changes both increase the dielectric dissipation factor and degrade mechanical properties of the copolymer. Thus, it will generally be preferable, if not essential, that the dielectric material contain at least one antioxidant which at its effective concentrations does not adversely affect either the dielectric constant or the dielectric dissipation factor. Examples of suitable antioxidants include 1,3,5-trimethyl-2,4,6-tris(3,5 ditert-butyl-4-hydroxybenzyl)benzene and 2,6-di-tert-butyl-p-cresol. It will also be generally desirable to minimize as far as feasibly possible the simultaneous exposure of the copolymer to oxygen and heat. The dielectric material 13 will generally have a dielectric constant of less than about 2.325, and more preferably in the range of about 2.29 to about 2.31. The dielectric constant of these copolymers can be calculated to an accuracy of better than 0.5 percent by employing the equation: $K = 2.276 + 2.01 (d - 0.9200)$, where d is the density of the copolymer. Where, as is highly desirable, the additives to the dielectric polymer do not significantly affect the dielectric constant, the dielectric constant of the dielectric material 13 can be considered to be the same as that of the polymer. The dielectric dissipation factor of the dielectric material 13 should be less than about 55 microradians at 30 megahertz, preferably less than about 45 microradians at 30 megahertz, and more preferably less than about 40 microradians at 30 megahertz. However, although the dielectric dissipation factor decreases with increasing density of the copolymer, other factors such as stiffness and ESCR are generally adversely affected by increasing density. Thus the dielectric dissipation factor of the copolymers will generally be in the range of about 20 to about 55 at 30 megahertz and for the presently preferred copolymers will be in the range of about 25 to 45, more preferably in the range of about 30 to about 40 microradians at 30 megahertz. As low molecular weight fractions have an adverse effect on the dielectric dissipation factor, it is presently preferred that the copolymer of the dielectric material 13 contain less than about 0.6 weight per cent low molecular weight material which is extractable when 50 grams of the copolymer in the form of particles having a maximum dimension less than about 4 mm is dispersed in 100 ml of toluene at room temperature for 14 days with 2 hours of stirring each day. The dielectric material 13 should have an environmental stress cracking resistance (ASTM-D 1963, using 100 percent Igepal) of at least 800 hours and preferably greater than 1000 hours. For process-ability the dielectric material 13 should have a melt index (ASTM D-1238-65T) in the range of about 0.1 to about 1 gram/10 minutes. The following examples are presented in further illustration of the invention and to provide comparison with materials not included within the scope of the invention.

EXAMPLE I

Samples of four commercial homopolymers of ethylene and seven copolymers of ethylene and n-1-hexene were molded in accordance with a standard procedure.

A sandwich is assembled of a ⅛-inch steel plate, a 20 mil bright chrome-plated brass plate, a sheet of 3.5 mil aluminum foil with oil-free surface, a 1/32-inch aluminum mold with cutouts for 5 inch by 5 inch square samples, the polymer (11 grams in each mold cut-out), and second aluminum foil, chrome plated brass and one-eighth inch steel layers to complete the assembly. This assembled structure is placed between the heated (350° F.) platens of a hydraulic press and the press closed to first contact. After one minute of heating the pressure is raised to 25 tons maximum during 2 minutes. The heat is then shut off and, without change of hydraulic pressure setting, cooling water is run through the press platens at a rate to cool them at 15° C. per minute. Fifteen to 20 minutes after the start of cooling the mold assembly is removed from the press and disassembled, and the aluminum foil layers pulled off the molded samples. Final sample thicknesses varied from 28 to 32 mils, uniform to ±1–2 mils. Samples for dielectric dissipation factor measurement were cut from these sheets with a die and a hammer against a heavy polyethylene cutting block.

The dielectric dissipation factor was determined by measuring the change in the dielectric dissipation factor of a General Radio Dielectric Sample Holder, Type 1,690-A, between measurements (a) with a 2-⅛ inch sample disk of 30 mil molded sheet of the polymer between the plates and (b) with the sample removed and the plates reduced in separation to restore the original capacitance. The sample holder is a micrometer-controlled, variable, parallel-plate capacitor. It is mounted on a Boonton 260A Q-Meter which has been modified by disconnecting the internal variable capacitor and connecting the sample holder as the only capacitor in the resonant circuit. One of several high-Q coils is connected in series with the sample holder to complete a series-resonant circuit. The oscillator of the Q-meter supplies a low voltage, high current RF excitation current to a parallel combination of a very low (0.02 ohm) resistor and the series-resonant circuit mentioned, and the vacuum-tube voltmeter of the Q-meter measures the voltage developed across the capacitor of the resonant circuit.

The Q of the resonant circuit is the ratio of the voltage across the capacitor at resonance to the voltage applied by the oscillator across the entire resonant circuit; at resonance the voltage across the capacitor is much the larger. It can be shown that the circuit $Q$ is related to the $Q$ of the coil and the dissipation factor, $D_c$, of the capacitor by the equation $$\frac{1}{Q_{ckt}} = \frac{1}{Q_{coil}} + D_c$$

Measurements are made at fixed frequency so $Q_{coil}$ does not change when $D_c$ changes as a result of removal of the sample. Writing $$\Delta D = D_c \text{ (sample in)} - D_c \text{ (sample out)}$$

we have $$\Delta_D = \frac{1}{Q_{ckt \text{ (sample in)}}} - \frac{1}{Q_{ckt \text{ (sample out)}}} = \frac{1}{Q_i} - \frac{1}{Q_o}$$

$\Delta D$ is due to dielectric loss (retardation of polarization) in the sample, but this loss affects only a portion, $C_x$, of the total capacitance, $C_T$, in the resonant circuit including both stray capacitance to ground and the capacitance between the plates of the sample holder. The dielectric loss factor of the polymer dielectric is $$D_{diel.} = \frac{C_T}{C_X}\left(\frac{1}{Q_i} - \frac{1}{Q_o}\right)$$

The frequency of measurement is determined primarily by the inductance of the coil but varies slightly with variations of sample thickness about the nominal value of 0.030 inch. For this reason, the exact frequencies of measurement varied slightly, from sample to sample, about the frequency values indicated in the tables. However, the variation of $D$ with frequency is sufficiently gradual that no correction for these small frequency variations was required. The repeatability of the measurement of values of $D$ below 50 microradians was better than ±2 microradians.

The results are set forth in the following table, wherein each listed value of dielectric dissipation factor is an average of at least five individual measurements.

TABLE I

| Run No. | Polymer | Density [a] | Melt index [b] | ESCR [c] | Dielectric [d] constant | Dielectric dissipation factor (microradians) | | | |
|---|---|---|---|---|---|---|---|---|---|
| | | | | | | 2.5 mHz | 5 mHz | 15.5 mHz | 30 mHz |
| 1 | Ethylene homopolymer | 0.960 | 0.2 | 60 | 2.36 | 18 | 19 | 22 | 24 |
| 2 | do | 0.960 | 0.3 | 15-20 | 2.36 | 21 | 22 | 23 | 22 |
| 3 | do | 0.963 | 0.74 | <20 | 2.36 | (*) | 15 | (*) | 21 |
| 4 | do | 0.917 | 1.2 | 2-20 | 2.27 | 56 | 66 | 79 | 86 |
| 5 | Ethylene-hexene copolymer [e] | 0.9352 | 0.16 | >1,000 | 2.31 | 18 | 25 | 29 | 37 |
| 6 | do.[e] | 0.935 | 0.16 | >1,000 | 2.31 | 20 | 24 | 30 | 38 |
| 7 | do.[e] | 0.952 | 0.2 | 75 | 2.34 | (*) | 17 | 21 | 23 |
| 8 | do.[e] | 0.929 | 0.11 | >1,000 | 2.29 | (*) | 39 | (*) | 50 |
| 9 | do.[e] | 0.929 | 0.23 | >1,000 | 2.29 | (*) | 38 | (*) | 50 |
| 10 | do.[e] | 0.935 | 0.23 | >1,000 | 2.31 | (*) | 32 | (*) | 43 |
| 11 | do.[e] | 0.935 | 0.30 | >1,000 | 2.31 | (*) | 30 | (*) | 41 |

*Values not obtained.
[a] ASTM D-1505-68, on sample molded by D-1928, Condition C, and cooling the press at 15° C./minute.
[b] ASTM D-1238-65T.
[c] ASTM D-1693-66.
[d] Values were calculated for 23° C. in accordance with McCall's equation: $K=2.76+2.01(d-.920)$ where K is the dielectric constant and $d$ is the density of the polyolefin. For the polymer utilized in the above runs, the calculated value is within ±.5% of the value for ASTM D-1531-61.
[e] Samples were molded from pelletized ethylene-n-1-hexene copolymer containing 0.015 wt. per cent 2,6 di-tert-butyl-p-cresol and 0.06 wt. percent 1,3,5 trimethyl-2,4,6-tris(3,5-di-tert-butyl-4-hydroxybenzyl)benzene, based on the weight of the polymer. The copolymer was prepared by copolymerization of ethylene and n-1-hexene in the presence of a catalyst comprising silica impregnated with about 2 weight percent, calculated as the metal, of chromium.

The high density ethylene homopolymers of runs 1-3 show very low dielectric dissipation factors, but have relatively high dielectric constants and very low ESCR.

The low density ethylene homopolymer of run 4 shows relatively high dielectric dissipation factor, which increases strongly with frequency, and also has a very low ESCR.

The ethylene-hexene copolymers of runs 5-11 show a decrease in the dielectric dissipation factor with increases in the density of the copolymer. However, the value of 75 for the ESCR of the 0.952 density copolymer is unsuitable.

EXAMPLE II

A polymerization run was conducted in a plant size reactor to produce a copolymer of ethylene and n-1-hexene of density 0.935 and a melt index of 0.25. The copolymer was prepared in a particle form process by copolymerization of ethylene and n-1-hexene in the presence of an activated catalyst comprising silica impregnated with about 2 weight per cent chromium oxide. The polymer was recovered from the reactor in the form of particle-form "fluff," and subsequently additions of 0.015 weight per cent of 2,6 di-tert-butyl-p-cresol and 0.06 weight per cent of 1,3,5 trimethyl-2,4,6-tris(3,5 di-tert-butyl-4-hydroxybenzyl)benzene were made to a quantity of this fluff at the inlet to a pelletizing extruder. The extruder inlet was blanketed with nitrogen to prevent the entrapment of oxygen from the atmosphere and the reaction of this oxygen with molten polymer in the extruder. A considerable quantity of polymer was extruded and cut into pellets and samples of the pellets were taken at a sequence of equally spaced times in the course of the operation. Sample disks were prepared and the dielectric dissipation factor thereof determined in accordance with the standard procedure previously described. The results are set forth in the following table.

TABLE II

| Sequential Sample No. | Dielectric Dissipation Factor (Microradians) | |
|---|---|---|
| | 5 Mhz | 30 Mhz |
| 1 | 26 | 34 |
| 2 | 26 | 35 |
| 3 | 24 | 33 |
| 4 | 25 | 33 |
| 5 | 25 | 33 |
| 6 | 24 | 33 |
| 7 | 24 | 34 |
| 8 | 24 | 34 |
| 9 | 24 | 34 |
| 10 | 24 | 34 |
| 11 | 26 | 32 |
| 12 | 25 | 34 |

The data of Table II demonstrate that an ethylene-1-hexene copolymer with low values of dielectric dissipation factor at 30 megahertz and at 5 megahertz can be made under plant conditions uniformly and reliably with very little variation with time during the operation. The data of Table III illustrate the dependence of dielectric dissipation factor upon frequency over a wider range of frequencies for a representative sample No. (4) of the plant-produced polymer.

TABLE III

Dissipation Factor vs. Frequency

| Frequency, Mhz. | Dielectric Dissipation Factor (Microradians) |
|---|---|
| 0.160 | 16 |
| 1.624 | 21 |
| 2.49 | 22 |
| 5.02 | 25 |
| 8.40 | 27 |
| 15.2 | 30 |
| 20.4 | 31 |
| 24.9 | 32 |
| 29.2 | 33 |
| 41.4 | 35 |

The great superiority of this polymer over the dielectric material used in the current SF ocean telephone cable is made obvious by comparison of its dissipation factors at 0.1, 1.0 and 6.0 megahertz with published specifications of the SF cable dielectric together with an extrapolated value at 30 megahertz, in Table IV.

TABLE IV

Dissipation Factors of Ethylene-Hexene Copolymer Compared with SF Cable Dielectric Polymer

| | Dielectric Dissipation Factor (Microradians) | |
|---|---|---|
| | Copolymer (Sample No. 4) | SF Cable Polymer |
| 0.1 Mhz | 16 | 45±10 |
| 1.0 Mhz | 20 | 61±5 |
| 6.0 Mhz | 25 | 9±5 |
| 30 Mhz | 33 | 95-100 |

Note: Values at 0.1, 1.0 and 6.0 obtained from plot of D vs. log f using data of Table III. The values for the SF cable were obtained from page 710 of *The Bell System Technical Journal*, May-June, 1970, with the value for 30 Mhz being an extrapolation of the published data.

EXAMPLE III

A series of copolymers of ethylene and another 1-olefin were produced in the presence of a catalyst comprising silica impregnated with about 2 weight per cent chromium oxide, the catalyst having been activated by heating to 1,400° F. and held at that temperature for 5 hours. Disk samples of each copolymer were prepared and the dielectric dissipation factor measured in accordance with the standard procedure described hereinabove. The results are set forth in the following table.

TABLE V

| Run Number | Comonomer | Den.[a] | M.I.[b] | f=2.5 Mhz. | 5 Mhz. | 15 Mhz. | 30 Mhz. |
|---|---|---|---|---|---|---|---|
| 1 | Propylene | .937 | 0.45 | (*) | 33 | (*) | 52 |
| 2 | do | .941 | 0.25 | (*) | 23 | (*) | 36 |
| 3 | do | .945 | 0.41 | (*) | 23 | (*) | 34 |
| 4 | do | .950 | 0.30 | (*) | 19 | (*) | 28 |
| 5 | 1-Butene | .930 | 0.48 | (*) | 34 | (*) | 52 |
| 6 | do | .933 | 0.36 | (*) | 30 | (*) | 49 |
| 7 | do | .934 | 0.77 | (*) | 25 | (*) | 38 |
| 8 | do | .939 | 0.51 | (*) | 22 | (*) | 34 |
| 9 | 1-Pentene | .931 | 0.42 | 36 | 40 | 48 | 54 |
| 10 | do | .937 | 0.42 | 24 | 27 | 34 | 40 |
| 11 | do | .942 | 0.37 | 19 | 22 | 27 | 30 |
| 12 | do | .947 | 0.31 | 13 | 16 | 20 | 23 |
| 13 | 3-Me-1-butene | .945 | 0.19 | 19 | 23 | 35 | 39 |
| 14 | do | .947 | 0.35 | 18 | 23 | 33 | 38 |
| 15 | do | .952 | 0.35 | 19 | 22 | 29 | 30 |
| 16 | 1-Octene | .937 | 0.28 | 22 | 25 | 32 | 32 |
| 17 | do | .941 | 0.26 | 17 | 20 | 24 | 25 |
| 18 | do | .946 | 0.34 | 15 | 16 | 20 | 26 |
| 19 | do | .951 | 0.28 | 11 | 14 | 18 | 18 |

[a] ASTM D-1505-68 on sample molded by D-1928, Condition C, and cooling the press at 15° C./minute.
[b] ASTM D-1238-65T.
*Value not obtained.

From the foregoing data and that of the previous examples, it can be seen that lower value of suitable density can vary according to the comonomer employed. Similarly, the upper value of suitable density can also vary according to the particular copolymer. However, the suitable density range for each copolymer is within the general range of about 0.928 to about 0.945, with the specific lower value for a given copolymer being determined as that at which the dielectric dissipation factor equals about 55 microradians at 30 megahertz. The specific upper value for a given copolymer is that which corresponds to the minimum acceptable mechanical properties, such as ESCR.

Reasonable variations and modifications are possible within the scope of the foregoing disclosure, the drawing, and the appended claims to the invention.

What is claimed is:

1. An electrical cable having at least one first conductor, at least one second conductor, and a dielectric material positioned between said at least one first conductor and said at least one second conductor, said dielectric material comprising a copolymer of ethylene and at least one 1-olefin having at least three carbon atoms per molecule, said copolymer having a density in the range of about 0.928 to about 0.945 gram/cc (ASTM Ds1505-68 on samples molded by D-1928, Condition C and cooling the press at 15° C. per minute), said dielectric material having a dielectric constant of less than about 2.325 (ASTM D-1531-61), a di-electric dissipation factor of less than about 55 microradians at 30 megahertz and an environmental stress cracking resistance of at least 800 hours (ASTM D-1963, using 100 percent Igepal).

2. A cable in accordance with claim 1 wherein said cable is a coaxial cable with said at least one first conductor being the inner conductor and said at least one second conductor being an outer conductor surrounding said at least one inner conductor.

3. A coaxial cable in accordance with claim 2 wherein the density of said copolymer is in the range of about 0.930 to about 0.937, wherein said dielectric constant is in the range of about 2.29 to about 2.31 wherein said dielectric loss factor is in the range of about 20 to about 55 microradians at 30 megahertz, and wherein said dielectric material occupies substantially all of the space between said inner conductor and said outer conductor.

4. A coaxial cable in accordance with claim 2 wherein said dielectric material further comprises an antioxidant which does not significantly adversely affect either the dielectric constant or the dielectric dissipation factor of said dielectric material.

5. A coaxial cable in accordance with claim 4 wherein said antioxidant is 1,3,5 trimethyl-2,4,6-tris(3,5 di-tert-butyl-4-hydroxybenzyl) benzene.

6. A coaxial cable in accordance with claim 4 wherein said antioxidant is 2,6 di-tert-butyl-p-cresol.

7. A coaxial cable in accordance with claim 2 wherein said copolymer consists essentially of ethylene and n-1-hexene and has an environmental stress cracking resistance of at least 1,000 hours (ASTM D-1693-66) and a melt index in the range of about 0.1 to about 1 gram/10 minutes (ASTM D-1238-65T).

8. A cable in accordance with claim 1 wherein said copolymer is a copolymer of ethylene and n-1-hexene.

9. A cable in accordance with claim 1 wherein said copolymer is a copolymer of ethylene and n-1-octene.

10. A cable in accordance with claim 1 wherein said copolymer is a copolymer of ethylene and n-1-butene.

11. A cable in accordance with claim 1 wherein said copolymer consists essentially of ethylene and at least one linear 1-olefin having from four to 10 carbon atoms per molecule.

12. A cable in accordance with claim 11 wherein said dielectric dissipation factor is less than about 40 microradians at 30 megahertz, and said environmental stress cracking resistance is at least 1,000 hours.

* * * * *

UNITED STATES PATENT OFFICE

CERTIFICATE OF CORRECTION

Patent No. 3,674,915            James E. Pritchard           Dated: July 4, 1972

It is certified that error appears in the above-identified patent and that said Letters Patent are hereby corrected as shown below:

Column 3, line 41, "ASTM-D 1963" should read -- ASTM-D-1693-66 --.
Column 7, line 56, "ASTM D-1505-68" should read -- ASTM-D-1505-68 --; line 62, "D-1963" should read -- D-1693-66 --.

Signed and sealed this 30th day of April 1974.

(SEAL)
Attest:

EDWARD M. FLETCHER, JR.
Attesting Officer

C. MARSHALL DANN
Commissioner of Patents